United States Patent Office 3,295,263
Patented Jan. 3, 1967

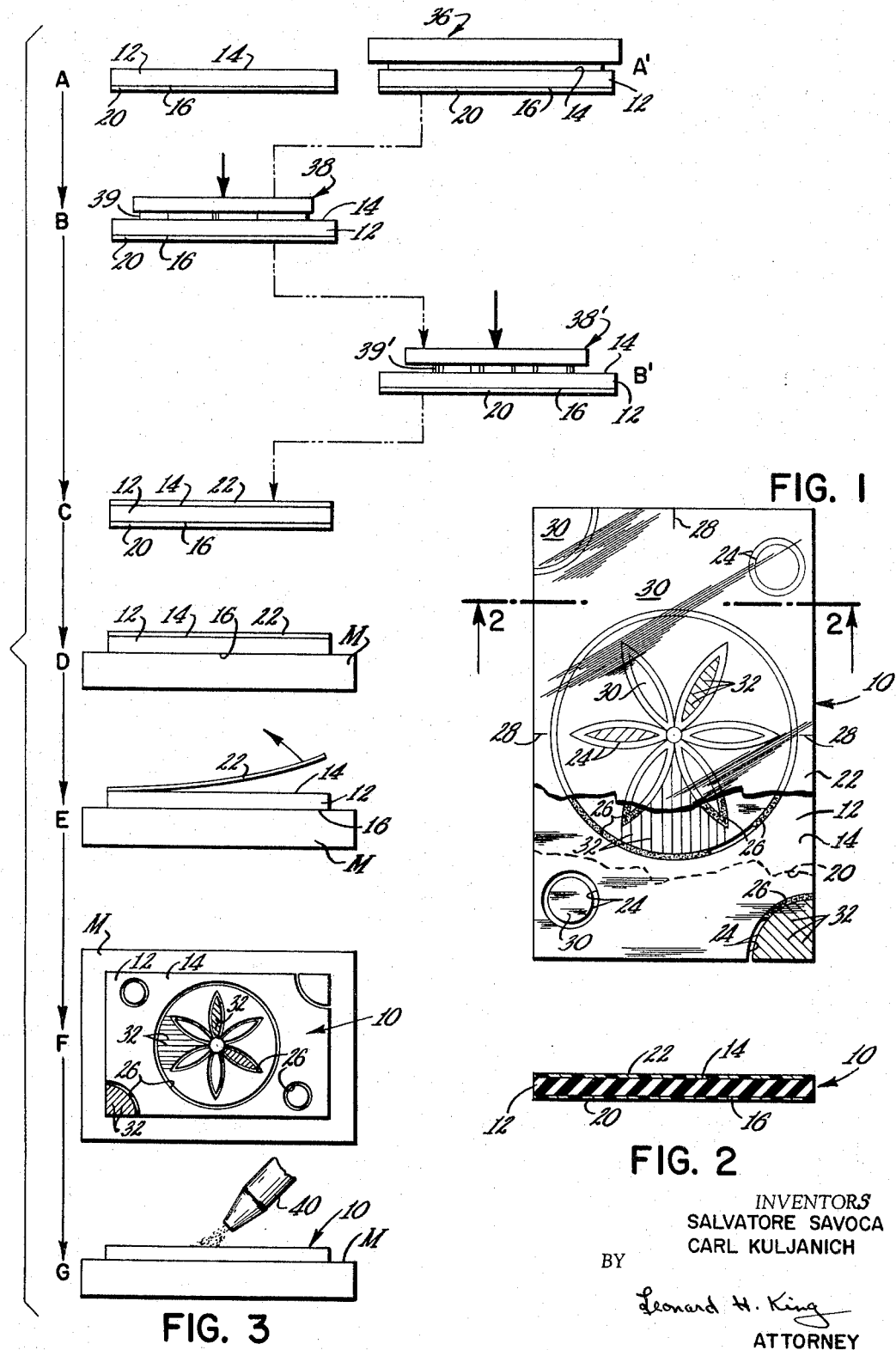

3,295,263
MASK FOR SANDBLASTING INDICIA IN STONE AND METHOD FOR MAKING SAME
Salvatore Savoca, College Point, and Carl Kuljanich, St. Albans, N.Y., assignors to Monument Processing Co., Long Island City, N.Y.
Filed Mar. 18, 1963, Ser. No. 265,661
13 Claims. (Cl. 51—262)

This invention relates to the art of cutting indicia into stone by sandblasting and more particularly to precut, mass-produced masks used therefor and the method of fabricating said masks.

As is well known in the stone cutting art, precision and accuracy are prime requisites for good workmanship. An error in sandblasting the workpiece could conceivably result in the spoilage of an expensive piece of material as well as a loss in time.

In the prior art, when sandblasting was employed for cutting indicia into stone, it was necessary to protect surfaces adjacent to the surface of the stone to be carved by a rubber mat adhesively secured to the face of the stone. Generally, a mat sufficiently large to cover the entire stone surface was placed over the face of the stone and the desired pattern cut first into the mat by free hand techniques. Portions corresponding to the final design were removed, leaving a rubber template surrounding the portions to be sandblasted. Conventional equipment was then employed to etch away the exposed portions of stone.

This technique has one inherent fault. Free hand pattern cutting results in irregularities and nonuiformity in the finished product. Furthermore, the accuracy of the finished product is heavily dependent upon the skills of the operator. It is therefore essential that means be provided that will substantially reduce the possibilities of errors. In addition, means must be provided for the accurate repetition of intricate designs on more than one work piece.

The present invention fulfills the foregoing requirements in the form of a rubber mat sandwiched between thin plastic sheets. The rubber mat may be mass-produced by having even the most intricate design die-cut therein. By using precision dies, the pattern may be repeated for any quantity of masks and yet, by a feature of the invention, each mask is usable just once, thus minimizing the possibility of pirating artistic work. The masks may be made to order or may be standard designs which are stocked and sold from a catalog. The masks may each represent only a portion of a larger design. In this case the masks would be assembled on the workpiece prior to use. It is obvious then that the accuracy of each mask is assured by the precision of the master die. Further, the present invention lends itself to an almost infinite variety of combinations and subcombinations of letters and designs so that distinctive combinations may be evolved and if desired, repeated from workpiece to workpiece.

Within the scope of the invention, it is envisioned that each mask may, if desired, have several self-destructive portions so that when the mask is removed after the completion of the sandblasting operation, the mask will not be reusable. This is accomplished by scoring or otherwise mutilating the mask in at least some of the areas that are not removed for the admission of the sandblasting particles. Therefore, when the mask is removed subsequent to the sandblasting, critical areas will be destroyed, intentionally rendering the mask unusable for more than one application.

The present invention lends itself equally well to applications either in the field, as on cornerstones of existing buildings and monuments, or in the shop. To further facilitate the use of the mask, in one embodiment of the invention portions that are to be removed for the passage of the sandblasting material are brightly colored so that even on the most intricate design, there is little likelihood of mistakes being made in removing scrap portions.

It is therefore an object of the present invention to provide an improved mask for cutting indicia into stone that permits qualitative repetition of intricate designs.

It is an additional object to provide improved masks for economically repeating an intricate design in a plurality of workpieces.

A further object is to provide a single use mask for cutting indicia into stone.

A still further object is to provide a multilayer mask comprised of a cut layer of rubber, removably secured by an adhesive between layers of plastic.

An additional object is to provide a method for preforming masks for sandblasting.

Still another object is to provide means integral with said masks whereby specific portions are indicated for removal for the admission of sandblasting particles.

A further object is to construct the masks so that they are self-destructive after a single use.

These and other objects and advantages of the present invention will, in part, be pointed out with particularity and will, in part, be apparent from the following description taken in conjunction with the accompanying drawing.

In the various figures of the drawing, like reference characters denote like parts.

In the drawing:

FIG. 1 is a face view of a typical mask.

FIG. 2 is a cross sectional view of the mask taken along line 2—2 of FIG. 1.

FIG. 3 illustrates the sequential steps in the method of fabricating a mask for cutting indicia into stone.

Referring now to the drawings, FIG. 1 and FIG. 2 illustrate the mask 10 of the present invention. Rubber mat 12 has front and rear surfaces 14 and 16 respectively, each covered with a pressure sensitive or other suitable adhesive. By means of the adhesive, a thin, flexible plastic sheet 20 is removably adhered to rear surface 16 and a clear, flexible plastic sheet 22 is removably secured to front surface 14. The synthetic resin employed in the plastic sheets are not critical; polyethylene, polyvinyl alcohol, polyvinyl chloride are typical of such sheets. Mat 12 has cut therein, as by a rule die, a design delineated by relatively closely spaced, parallel cuts 24. It is preferable that cuts 24 go through mat 12 completely but not through plastic sheet 20. The areas of the design defined by cuts 24 that are to be removed for the passage of sandblasting particles are preferably distinctively colored as indicated by stipled areas 26. This eliminates the possibility of inadvertently removing any other portion which would result in an incorrect design and consequently a great loss in both time and money. Plastic sheet 20 serves to protect the adhesive covered rear surface 16 prior to the application of mat 12 to the workpiece.

Front plastic sheet 22 serves a dual purpose in that primarily it retains the discrete areas of the design in their proper place after rear plastic sheet 20 has been removed and the mat adhered to the surface of the workpiece. Sheet 22 may be either a clear or opaque plastic, and may be provided with registration marks 28 on the periphery thereof that are used to accurately align the mat on the workpiece.

The uncolored areas 30 of mat 12, that is, the areas not removed for sandblasting, may be provided with additional, secondary die cuts 32. As will be more fully described hereinafter, front plastic sheet is removed after the mat has been adhered to the workpiece just prior to sandblasting. After the indicia or design is cut into the stone, the mat is then removed and, by the provision of cuts 32, will be destroyed. That is, there being no adhesively held plastic sheet to retain the remaining parts in accurate alignment with each other, they will separate. Cuts 32, passing completely through mat 12, are made in critical areas that will assure self-destruction of the design when the mask is removed after sandblasting. This precludes the reuse of a valuable, artistic design without the consent of the originator. It should be noted that since the mat is adhered to the workpiece as a unit with the front plastic sheet in place, these additional cuts will not affect the accuracy of the design, even after the proper colored portions are removed immediately prior to sandblasting.

FIG. 3 illustrates the mask-fabricating method of the present invention as well as the use thereof by means of sequential steps A–G. A relatively simple design is shown for purposes of illustration, it being understood that more complicated designs may just as readily be used. Step A illustrates a mat 12 having a plastic sheet 20 affixed to the rear surface thereof. Alternative step A' indicates printing means 36, such as silk screen apparatus, applying a distinctive color to the areas that will ultimately be removed for sandblasting the design into stone. Rule die 38, having cutting edges 39, is shown in step B being impressed to form the design in the rubber mat 12. Alternative step B' indicates rule die 38', having different cutting edges 39', forming the self-destructive cuts in at least some of the uncolored areas 30 of mat 12. It should be understood that steps B and B' may be combined into a single operation if so desired. The application of clear plastic sheet 22 to surface 14 of mat 12 is shown in step C. Subsequent to the operation of step C, sheet 20 is removed, exposing adhesive covered surface 16 which is adhered to workpiece M, as illustrated in step D. In step E, the clear plastic sheet 20 is then stripped off and in step F, the colored portions 26 of the design removed to produce the mat shown. As shown in step G, conventional sandblasting apparatus 40 is then used against the surface of workpiece M that is exposed by mask 10. After completion of the sandblasting operation, mask 10 is stripped off and, if secondary die cuts 32 have been included, then the mask will fall apart since there is no longer any plastic sheeting to retain the various parts.

Thus there have been provided an improved mask for cutting indicia in stone and an improved method for the manufacture thereof. The mask is accurately held together after removal of the rear protective sheet by means of the clear front plastic sheet. The areas of the design that are to be removed are clearly delineated by means of distinctive coloring and after a single use, the mask is destroyed, thus precluding additional, unintended use. It is also contemplated, and within the scope of the present invention, to use paper, wax paper, copper or aluminum foil in place of the plastic sheets referred to hereinabove. If a nonplastic, opaque covering is used, then indicia will also be printed thereon so that accurate alignment may be made on the workpiece. It will be appreciated that a rigid sheet 20, such as cardboard, composition board, or the like, may be used.

There has been disclosed heretofore the best embodiment of the invention presently contemplated and it is to be understood that various changes and modifications may be made by those skilled in the art without departing from the spirit of the invention.

What is claimed is:

1. A sandblasting mask comprising:
   (a) a first sheet of resilient material having a front surface, a rear surface and a plurality of slits extending between the front and rear surfaces to define a sandblasting pattern;
   (b) a second sheet of flexible material adhesively secured to one surface of said resilient sheet to define a mask assembly adapted to be removably secured to the article to be sandblasted; and
   (c) a third sheet of material adhesively secured to said mask assembly and arranged to support isolated portions of said first sheet.

2. The mask of claim 1 wherein said second sheet is translucent.

3. The mask of claim 1 wherein said third sheet is flexible.

4. The mask of claim 1 wherein said first sheet has registration marks formed thereon.

5. The mask of claim 1 wherein at least some of the areas between said pattern slits have random slits formed therein, said random slits extending substantially between said front and rear surfaces and extending between adjacent pattern defining slits in the plane of said first sheet.

6. The mask of claim 1 wherein the areas bounded by said pattern defining slits have a different surface appearance than the remaining areas.

7. The mask of claim 1 wherein the areas bounded by said pattern defining slits are colored differently from the remaining areas.

8. The method of forming a mask for sandblasting comprising the steps of:
   (A) slitting a pattern substantially through a resilient mat having first and second surfaces the first of which is strippably secured to a support sheet, the second mat surface being exposed;
   (B) coating the exposed second surface of said mat with adhesive; and
   (C) securing a flexible sheet to the adhesive coated second surface of said mat.

9. The method of claim 8 including the step of printing said exposed second surface of said mat in a pattern conforming in shape and location to the ultimate pattern prior to securing the flexible sheet thereto.

10. The method of claim 8 including the step of slitting substantially through said mat in at least some areas other than those bounded by said pattern defining slits prior to securing the said flexible sheet thereto.

11. The method of forming a mask for sandblasting comprising the steps of:
   (A) securing a first sheet to a resilient mat having front and rear adhesively coated surfaces, the first sheet being secured to the rear adhesive coated surface of the mat;
   (B) color printing the front surface of said mat in a pattern conforming in shape and location to the ultimate pattern to be sandblasted;
   (C) slitting the pattern to be sandblasted substantially through said mat;
   (D) slitting substantially through said mat at least some of the areas other than those bounded by said pattern defining slits; and
   (E) securing a flexible sheet to the front adhesive coated surface of said mat.

12. The method of forming a mask for sandblasting a workpiece, said method comprising the steps of:
   (A) securing a first sheet to a resilient mat having front and rear adhesively coated surfaces, the first sheet being secured to the rear adhesive coated surface of the mat;
   (B) slitting the pattern to be sandblasted substantially through said mat;
   (C) securing a flexible second sheet to the front adhesive coated surface of said mat;
   (D) removing said first sheet;
   (E) adhering said adhesive coated rear surface to the workpiece to be sandblasted;
   (F) removing said flexible second sheet; and
   (G) removing the portions of said mat bounded by said pattern defining slits.

13. The method of forming a mask for sandblasting a workpiece, said method comprising the steps of:
   (A) securing a first sheet to a resilient mat having front and rear adhesively coated surfaces, the first sheet being secured to the rear adhesive coated surface of the mat;

(B) color printing the front surface of said mat in a pattern conforming in shape and location to the ultimate pattern to be sandblasted;
(C) slitting the pattern to be sandblasted substantially through said mat;
(D) slitting substantially through said mat at least some of the areas other than those bounded by said pattern defining slits;
(E) securing a flexible sheet to the front adhesive coated surface of said mat;
(F) removing said first sheet;
(G) adhering said adhesive coated rear surface of said mat to a workpiece to be sandblasted;
(H) removing said flexible sheet; and
(I) removing the portions of said mat bounded by said pattern defining slits.

References Cited by the Examiner

UNITED STATES PATENTS

| | | | |
|---|---|---|---|
| 1,882,526 | 10/1932 | Smith | 51—310 X |
| 2,156,696 | 5/1939 | Knox | 51—312 |
| 2,251,647 | 8/1941 | Wartha | 51—262 X |
| 2,410,472 | 11/1946 | Wartha | 51—262 X |
| 2,671,978 | 3/1954 | Brusetti | 51—312 |
| 3,089,800 | 5/1963 | Colfer et al. | 161—406 X |

LESTER M. SWINGLE, *Primary Examiner.*